UNITED STATES PATENT OFFICE.

JOHN HENRY SMITH, OF ZURICH, SWITZERLAND, AND WALDEMAR MERCKENS, OF MÜLHAUSEN, GERMANY.

BLEACH-OUT PROCESS OF COLOR PHOTOGRAPHY.

1,013,458.      Specification of Letters Patent.      Patented Jan. 2, 1912.

No Drawing.      Application filed January 26, 1907. Serial No. 354,237.

*To all whom it may concern:*

Be it known that we, JOHN HENRY SMITH, a subject of the King of Great Britain, residing in Zurich, in the Canton of Zurich, Republic of Switzerland, whose post-office address is No. 417 Seestrasse, Zurich, and WALDEMAR MERCKENS, a subject of Germany, residing in Mülhausen, Elsass, Germany, whose post-office address is No. 1 Schwarzwaldplatz, Mülhausen, have invented certain new and useful Improvements in the Bleach-Out Process of Color Photography; and we do hereby declare the following to be a full, clear, and exact description of the invention, such as will enable others skilled in the art to which it appertains to make and use the same.

We have applied for patent in Germany on February 2nd 1906, Application S. 22257 VI/57ᵇ.

In the course of experiments for the production of bleach-out sensitive surfaces we found that a regularity exists in regard to the wandering of dyes from a coating of one medium into that of another, more especially from gelatin into collodion (*i. e.* the nitro cellulose residue), and from this again into gelatin. The law consists in the strong tendency which acid dyes exhibit toward gelatin, whereas basic dyes possess a strong affinity toward nitrocellulose. By acid dyes such dye stuffs are understood which contain an acid group, the residue of such a group or the ester of such a group. If a mixture of dyes in gelatin solution consisting of erythrosin, auramin and methylene blue is coated upon a collodion base, the basic colors auramin and methylene blue wander into the collodion film, and the resulting papers on examination show a green collodion film underneath a red gelatin film. If a mixture of the same dyes in collodion is coated upon a gelatin base, the erythrosin wanders into the gelatin leaving a green collodion film upon a red gelatin film. If, instead of these colors, flavanilin (basic) and flavanilin S (acid) be employed, the former gives the same result as auramin, whereas flavanilin S wanders into the gelatin as erythrosin did. A mixture of flavanilin S, erythrosin and methylene blue in collodion coated upon a gelatin base yields an orange-colored gelatin film upon a blue collodion film; if however in place of methylene blue an acid blue dye *e. g.* naphthyl blue 2 B be coated in collodion upon gelatin, a colored gelatin film underneath a colorless collodion film is the result; or if coated in gelatin solution upon a collodion base, a colorless collodion film underneath a colored gelatin film is the result; in the latter case the dyes being already in a state of rest do not wander. If, instead of three acid dyes three basic ones *e. g.* safranin, auramin and methylene blue are employed in whichever medium they are mixed and coated colored collodion and colorless gelatin are the result. If the basic dyes are coated in a gelatin solution upon a gelatin base, underneath which is a collodion film, the basic dyes will wander through the gelatin base even should this be colored with one or more acid dyes into the collodion film; the acid dyes behave similarly inasmuch as they will wander through a collodion layer to find their state of rest in a gelatin film.

In the preparation of bleach-out paper, it has been usual, in many cases, to employ both acid and basic dyes together. However, it is not possible to coat an emulsion containing both acid and basic dyes direct upon a paper support, in such manner that all the dyes remain in the emulsion film; in every case, the dyes separate more or less. This separation is unavoidable because otherwise, a reaction between the acid and basic dyes would occur.

It is exceedingly difficult to coat with ordinary coating machinery a solution containing one or more dyes, as the slightest difference in the thickness of coating, which would not be observed in the case of silver bromid paper or plates, will form streaks which must be altogether avoided in the bleach-out process. To coat several layers of differently colored dye solutions one upon another so that an evenly colored harmonious surface results is almost impossible, the faults are increased in each successive coating so that one or other of the colors is in preponderance. This difficulty of coating a second film of color emulsion may however be entirely overcome by the utilization of the principle of wandering, inasmuch as the acid or basic dyes are given the opportunity to wander into a state of rest. The second coating can thus be dispensed with as the separation of the dyes takes place automatically. The wandering is so regular that it is not possible to know from an inspection of the surface of the paper if it contains one or two colored films it being perfectly harmonious.

Experiments relating to the coating of gelatin dye solutions upon collodion have been published, but these experiments gave no satisfactory results, because the experimenter did not understand the principle of the wandering of the dyes. The cause of the failure of these experiments lay in the fact that the basic dyes have a similar affinity to the paper tissue as to collodion itself, so that under the conditions which obtained in those experiments the dyes not only wandered into the collodion base, but also into the tissue of the paper. If a coating of gelatin, glue, etc., between the collodion base and the paper surface had been employed a satisfactory result would have been obtained. The experimenter never saw in the fact of some dyes wandering that certain technical advantages could be obtained. He sought rather to prevent the wandering from occurring and on this account was not successful in preparing a bleach-out paper: although it would have been possible for him to have prevented the wandering altogether by coating the paper with a preliminary solution of resin or lac. The publication of the negative results obtained from the experimenter can never collide with our invention, more especially as we have shown above that the experimenter had not the slightest acquaintance with the nature of the principle of wandering, and rather looked upon the wandering itself as a distinct technical disadvantage.

Other technical advantages pertaining to the application of the wandering principle may be mentioned: In cases where it is necessary to obtain absolutely sharp pictures it is necessary to have all the dyes contained in one layer; this might of course be obtained as mentioned above by the use of a coating of resin or lac, but this again would be accompanied by other technical difficulties, such as stickiness, slow drying, etc. It is much preferable to apply the principle mentioned above of the affinity shown by the dyes to certain layers of rest, and either coat the dyes in such a layer upon paper which has received a coating having no affinity to the dyes employed, or to coat them in a layer having no affinity, upon paper prepared with a coating for which the dyes have affinity, thus allowing them to wander to their position of rest. In the case of the employment of acid dyes in gelatin solution the emulsion may be coated direct upon collodion paper, whereas in the case of a mixture of basic dyes, coated in gelatin solution upon collodion another gelatin coating would be required between the paper and the collodion film to prevent the dyes entering the tissue of the paper. In the case of coating acid dyes in collodion solution upon gelatin paper no such isolating layer is required as the dyes have a greater affinity to the gelatin than to the paper; in the employment of basic dyes in collodion solution the emulsion may also be coated direct upon gelatin in paper as the dyes are already in their position of rest.

We have already referred to the process of obtaining two layers of differently colored film; it is easy to see that by this means mixtures of basic and acid dyes can be separated at will in the simplest manner, so that the dyes may be brought or allowed to wander in the upper or lower stratum as may be most suitable for their being sensitized; the sensitizers being either added direct to the emulsion layer or allowed to be absorbed by the dyes from a sensitizing bath into which the dyed films are subsequently placed, by which means the sensitiveness of the one layer may be increased to that of the other one.

Instead of gelatin as matrix other similar bodies e. g. glue, isinglass, gum, albumen, casein, etc., may be employed, and instead of nitrocellulose other cellulose derivates, e. g. cellulose acetate, etc., and other lac yielding bodies may be used.

What we claim is:

1. A process for the manufacture of bleach out surfaces, consisting in emulsifying a plurality of dyes in a vehicle for which they have relatively low affinity, and coating the emulsion upon a prepared layer for which the dyes have relatively high affinity, to allow the dyes to pass into said layer.

2. A process for the manufacture of bleach out surfaces, consisting in emulsifying a plurality of basic dyes in a vehicle for which they have relatively low affinity, and coating the emulsion upon a prepared layer for which the dyes have relatively high affinity, to allow the dyes to pass into said layer.

3. A process for the manufacture of bleach out surfaces, consisting in emulsifying a plurality of dyes in a gelatinous vehicle for which they have relatively low affinity, and coating the emulsion upon a prepared layer for which the dyes have relatively high affinity, to allow the dyes to pass into said layer.

4. A process for the manufacture of bleach out surfaces, consisting in emulsifying a plurality of dyes in a vehicle for which they have relatively low affinity, and coating the emulsion upon a prepared nitrocellulose layer for which the dyes have relatively high affinity, to allow the dyes to pass into said layer.

5. A process for the manufacture of bleach out surfaces, consisting in emulsifying a plurality of dyes in a vehicle for which they have relatively low affinity, and coating the emulsion upon a prepared layer of nitrocellulose mounted upon paper and for which prepared layer the dyes have relatively high affinity, to allow the dyes to pass into said prepared layer.

In testimony whereof, we have signed our names to this specification in the presence of two subscribing witnesses.

JOHN HENRY SMITH.
WALDEMAR MERCKENS.

Witnesses:
HERMANN HUBER,
JOSEPH SIMON.